United States Patent [19]
Lorenz et al.

[11] 3,884,996
[45] May 20, 1975

[54] O,O-DIALKYL-1-CYANOALKYL-KETONOXIME-THIONOPHOSPHORIC ACID ESTERS

[75] Inventors: Walter Lorenz, Wuppertal; Manfred Jautelat, Hilgen; Ingeborg Hammann, Cologne; Bernhard Homeyer, Opladen, all of Germany

[73] Assignee: Bayer Aktiengesellschaft, Leverkusen, Germany

[22] Filed: Jan. 15, 1974

[21] Appl. No.: 433,603

[30] Foreign Application Priority Data
Feb. 1, 1973 Germany............................ 2304848

[52] U.S. Cl............ 260/940; 260/464; 260/465.5 R; 424/210
[51] Int. Cl................................. C07f 9/16; A01n 9/36
[58] Field of Search..................................... 260/940

[56] References Cited
FOREIGN PATENTS OR APPLICATIONS
1,238,902  4/1967  Germany........................... 260/940

Primary Examiner—Anton H. Sutto
Attorney, Agent, or Firm—Burgess, Dinklage & Sprung

[57] ABSTRACT

O,O-dialkyl-1-cyanoalkyl-ketonoxime-thionophosphoric acid esters of the formula

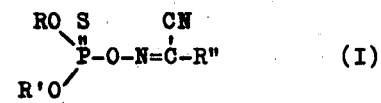

(I)

in which
R and R' each independently is lower alkyl, and
R'' is n-propyl, iso-propyl, 1,1-dimethyl-propyl or optionally methyl-substituted cyclopentyl or cyclohexyl, which possess insecticidal and acaricidal properties.

7 Claims, No Drawings

O,O-DIALKYL-1-CYANOALKYL-KETONOXIME-THIONOPHOSPHORIC ACID ESTERS

The present invention relates to and has for its objects the provision of particular new 0,0-dialkyl-1-cyanoalkyl-ketonoxime-thionophosphoric acid esters, i.e., 0,0-di-lower alkyl-1-cyanoalkyl- or -cycloalkyl-ketonoximethionophosphoric acid esters, which possess insecticidal or acaricidal properties, active compositions in the form of mixtures of such compounds with solid and liquid dispersible carrier vehicles, and methods for producing such compounds and for using such compounds in a new way especially for combating pests, e.g., insects and acarids, with other and further objects becoming apparent from a study of the within specification and accompanying examples.

It is known from German Published Specification DAS 1,052,981 and 1,238,902 that thionophosphoric(phosphonic) acid ester oximes, for example 0,0-diethyl- (Compound A) or 0,0-dimethyl-(acetonoxime) (Compound B), 0,0-dimethyl-(1-cyano-1-phenyl-ketonoxime)- (Compound C), 0,0-dimethyl-(Compound D) or 0,0-diethyl-(1-cyano-1-tert.-butyl-ketonoxime)-thionophosphoric acid ester (Compound E) and 0-ethyl-(1-cyano-1- tert.-butyl-ketonoxime)-thionoethane-phosphonic acid ester (Compound F), possess insecticidal and acaricidal properties.

The present invention provides thionophosphoric acid oxime derivatives of the general formula

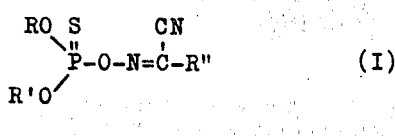

in which
R and R' each independently is lower alkyl, and
R" is n-propyl, iso-propyl, 1,1-dimethyl-propyl or optionally methyl-substituted cyclopentyl or cyclohexyl.

R and R' preferably denote straight-chain or branched alkyl with 1 to 4, especially 1 to 3, carbon atoms.

Surprisingly, the thionophosphoric acid oxime derivatives according to the invention are distinguished by a better insecticidal activity, especially soil-insecticidal activity, and acaricidal activity, and in some cases nematocidal activity, than previously known compounds of analogous structure and of the same type of action. The new compounds can not only be employed against insects and mites which damage plants, but also against hygiene pests and pests of stored products. The compounds according to the invention thus represent a genuine enrichment of the art. Furthermore, they contribute to meeting the constant demand for new active compounds in the field of pesticides. The latter arises from the fact that the commercially available agents have to meet constantly higher standards, particularly in respect of the protection of the environment, for example low toxicity towards warm-blooded animals and low phytotoxicity, rapid degradation in and on the plant with short intervals required between application of the pesticide and harvesting and activity against resistant pests.

The invention also provides a process for the production of a thionophosphoric acid oxime derivative of the formula (I) in which an oxime of the general formula

in the form of an alkali metal salt, alkaline earth metal salt or ammonium salt, or in the presence of an acid-binding agent, is reacted with a thionophosphoric acid ester halide of the general formula

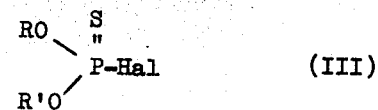

in the abovementioned formulae
R, R' and R" have the abovementioned meanings, and
Hal denotes halogen, preferably chlorine.

If, for example, 0,0-dimethylthionophosphoric acid ester chloride and 1-cyano-1-(1'-methylcyclohexyl)-ketonoxime are used as starting materials, the course of the reaction can be represented by the following formula scheme:

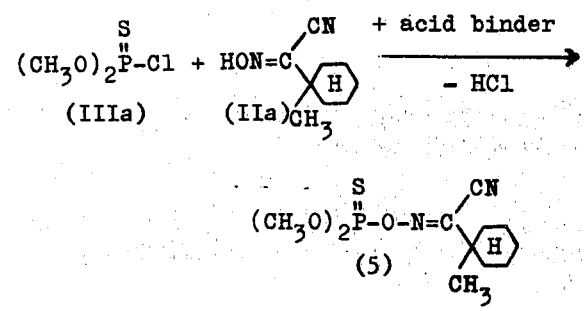

The thionophosphoric acid ester halides of the formula (III) are known from the literature and can be prepared according to customary methods. The following may be mentioned as examples: 0,0-dimethyl-, 0,0-diethyl-, 0,0-di-n-propyl-, 0,0-di-iso-propyl-, 0-methyl-0-ethyl- and 0-ethyl-0-isopropyl-thionophosphoric acid ester choride.

The oxime derivatives (II) which have not yet been described in the literature may be obtained in a customary manner from the corresponding carboxylic acid anilides by reaction with thionyl chloride to give the imide-chloride and further reaction, for example with copper cyanide, to give the α-iminonitrile derivative, which is then converted into the oxime. The following may be mentioned individually as examples: 1-n-propyl-, 1-iso-propyl-, 1-(1',1'-dimethylpropyl)-and 1-(1'-methylcyclohexyl)-1-cyanoketonoxime.

The process for the preparation of the new thionophosphoric acid oxime derivatives (I) is preferably carried out in the presence of a solvent which term includes a mere diluent. Practically all inert organic solvents can be used for this purpose. These include, in particular, aliphatic and aromatic optionally chlorinated hydrocarbons, for example benzene, toluene, xylene, benzine, methylene chloride, chloroform, carbon tetrachloride and chlorobenzene; ethers, for example diethyl ether, dibutyl ether and dioxan; ketones, for example acetone, methyl ethyl ketone, methyl isopropyl ketone and methyl isobutyl ketone; and nitriles, for example acetonitrile and propionitrile.

All customary acid-binding agents can be used as acid acceptors. Alkali metal carbonates and alkali metal alcoholates, such as sodium carbonate and potassium carbonate, sodium methylate and ethylate and potassium methylate and ethylate, and also aliphatic, aromatic or heterocyclic amines, for example triethylamine, dimethylamine, dimethylaniline, dimethylbenzylamine and pyridine, have proved particularly suitable.

The reaction temperature can be varied within a substantial range. In general, the reaction is carried out at 10° to 100°C, preferably at 20° to 60°C, and under normal pressure.

In carrying out the process, the oxime is mostly employed in an excess of 10 to 20%. The reaction is in general carried out in a suitable solvent in the presence of an acid acceptor and the reaction mixture is then stirred for one or more hours and subsequently poured into water. The oil which separates out may be taken up in an organic solvent, for example benzene, and the mixture worked up according to customary methods.

The new compounds are obtained in the form of oils, some of which cannot be distilled without decomposition but can be freed of the last volatile constituents by so-called "slight distillation," that is to say prolonged heating to moderately elevated temperatures under reduced pressure, and they can be purified in this way. They are characterized, above all, by the refractive index.

As has already been mentioned, the thionophosphoric acid oxime derivatives according to the invention are distinguished by excellent insecticidal, especially soil-insecticidal, and acaricidal activity towards plant pests, hygiene pests and pests of stored products. They couple a low phytotoxicity with a good action against both sucking and biting insects and mites and in part also display a nematocidal action.

For this reason, the compounds according to the invention can be employed successfully as pesticides in plant protection as well as in the hygiene field and the field of protection of stored products.

To the sucking insects there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lactularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly and moth caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cottom worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (*Coleoptera*), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra or Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes* spec.) and larvae of the cockchafer (*Melolontha melolontha*); cockroaches, such as the German cockroach (*Blattella germanica*), American cockroach (*Periplaneta americana*), Madeira cockroach (*Leucophaea or Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Acheta domesticus*); termites such as the eastern subterranean termite (*Reticulitermes flavipes*) and *Hymenoptera* such as ants, for example the garden ant (*Lasius niger*).

The *Diptera* comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) the bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (*Acari*) there are classed, in particular, the spider mites (*Tetranychidae*) such as the twospotted spider mite (*Tetranychus urticae*) and the European red mite (*Paratetranychus pilosus = Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the new compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or fungicides, bactericides, rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g., about 20–100% by weight of the active compound.

Furthermore, the present invention contemplates methods of selectively killing, combating or controlling pests, e.g., insects and acarids, which comprises applying to at least one of correspondingly (a) such insects, (b) such acarids, and (c) the corresponding habitat thereof, i.e., the locus to be protected, a correspondingly combative or toxic amount, i.e., an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Drosophila test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier, and the concentrate was diluted with water to the desired concentration.

1 cm$^3$ of the preparation of the active compound was applied with a pipette to a filter paper disc of 7 cm diameter. The wet disc was placed in a glass vessel containing 50 vinegar flies (*Drosophila melanogaster*) and covered with a glass plate.

After the specified periods of time, the destruction was determined as a percentage: 100% means that all the flies were killed; 0% means that none of the flies were killed.

The active compounds, their concentrations, the evaluation times and the degree of destruction can be seen from the following Table 1:

To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

Table 1

(Drosophila test)

| Active compound | Active compound concentration in % | Degree of destruction in % after 1 day |
|---|---|---|
| $\text{C}_6\text{H}_5-\underset{\text{CN}}{\text{C}}=\text{N}-\text{O}-\underset{\text{S}}{\overset{\|}{\text{P}}}(\text{OCH}_3)_2$ (known) (C) | 0.1<br>0.01<br>0.001<br>0.0001 | 100<br>100<br>100<br>20 |
| $(\text{CH}_3)_2\text{C}=\text{N}-\text{O}-\underset{\text{S}}{\overset{\|}{\text{P}}}(\text{OCH}_3)_2$ (known) (B) | 0.1<br>0.01 | 100<br>0 |
| $(\text{CH}_3)_2\text{C}=\text{N}-\text{O}-\underset{\text{S}}{\overset{\|}{\text{P}}}(\text{OC}_2\text{H}_5)_2$ (known) (A) | 0.1<br>0.01 | 100<br>0 |
| $\text{CH}_3-\text{CH}_2-\text{CH}_2-\underset{\text{CN}}{\text{C}}=\text{N}-\text{O}-\underset{\text{S}}{\overset{\|}{\text{P}}}(\text{OC}_2\text{H}_5)_2$ (4) | 0.1<br>0.01<br>0.001<br>0.0001 | 100<br>100<br>100<br>100 |
| $(\text{CH}_3)_2\text{CH}-\underset{\text{CN}}{\text{C}}=\text{N}-\text{O}-\underset{\text{S}}{\overset{\|}{\text{P}}}(\text{OC}_2\text{H}_5)_2$ (3) | 0.1<br>0.01<br>0.001<br>0.0001<br>0.00001 | 100<br>100<br>100<br>100<br>100 |
| $\text{C}_2\text{H}_5-\underset{\text{CH}_3}{\overset{\text{CH}_3}{\text{C}}}-\underset{\text{CN}}{\text{C}}=\text{N}-\text{O}-\underset{\text{S}}{\overset{\|}{\text{P}}}(\text{OC}_2\text{H}_5)_2$ (1) | 0.1<br>0.01<br>0.001<br>0.0001 | 100<br>100<br>100<br>100 |

EXAMPLE 2

Plutella test

Solvent: 3 parts by weight of acetone

Emulsifier: 1 part by weight of alkylaryl polyglycol ether

After the specified periods of time, the degree of destruction was determined as a percentage: 100% means that all the caterpillars were killed whereas 0% means that none of the caterpillars were killed.

The active compounds, the concentrations of the active compounds, the evaluation times and the results can be seen from the following Table 2:

Table 2

(Plutella test)

| Active compound | Active compound concentration in % | Degree of destruction in % after 3 days |
|---|---|---|
| $(CH_3)_2C=N-O-\overset{S}{\underset{\|}{P}}(OC_2H_5)_2$ (known) (A) | 0.1<br>0.01 | 40<br>0 |
| $CH_3-CH_2-CH_2-\underset{\|}{\overset{CN}{C}}=N-O-\overset{S}{\underset{\|}{P}}(OC_2H_5)_2$ (4) | 0.1<br>0.01 | 100<br>100 |
| $(CH_3)_2CH-\underset{\|}{\overset{CN}{C}}=N-O-\overset{S}{\underset{\|}{P}}(OC_2H_5)_2$ (3) | 0.1<br>0.01 | 100<br>90 |
| $C_2H_5-\underset{\underset{CH_3}{\|}}{\overset{\overset{CH_3}{\|}}{C}}-\underset{\|}{\overset{CN}{C}}=N-O-\overset{S}{\underset{\|}{P}}(OC_2H_5)_2$ (1) | 0.1<br>0.01 | 100<br>85 |

EXAMPLE 3

Myzus test (contact action)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 3:

Table 3

(Myzus test)

| Active compound | Active compound concentration in % | Degree of destruction in % after 1 day |
|---|---|---|
| $(CH_3)_2C=N-O-\overset{S}{\underset{\|}{P}}(OC_2H_5)_2$ (known) (A) | 0.1<br>0.01 | 40<br>0 |
| $CH_3-CH_2-CH_2-\underset{\|}{\overset{CN}{C}}=N-O-\overset{S}{\underset{\|}{P}}(OC_2H_5)_2$ (4) | 0.1<br>0.01 | 100<br>90 |
| $(CH_3)_2CH-\underset{\|}{\overset{CN}{C}}=N-O-\overset{S}{\underset{\|}{P}}(OC_2H_5)_2$ (3) | 0.1<br>0.01 | 100<br>90 |
| $C_2H_5-\underset{\underset{CH_3}{\|}}{\overset{\overset{CH_3}{\|}}{C}}-\underset{\|}{\overset{CN}{C}}=N-O-\overset{S}{\underset{\|}{P}}(OC_2H_5)_2$ (1) | 0.1<br>0.01 | 100<br>90 |
| $(C_2H_5O)_2\overset{S}{\underset{\|}{P}}-O-N=C-\underset{CH_3}{\overset{CN}{\bigcirc H}}$ (2) | 0.1<br>0.01 | 100<br>40 |

EXAMPLE 4

Critical concentration test/soil insects

Test insect: *Tenebrio molitor* larvae in the soil
Solvent: 3 parts by weight of acetone
Emulsifier: 1 part by weight of alkylaryl polyglycol ether To produce a suitable preparation of active compound, 1 part by weight of active compound was mixed with the stated amount of solvent, the stated amount of emulsifier was added and the concentrate was diluted with water to the desired concentration. The preparation of active compound was intimately mixed with the soil. The concentration of the active compound in the preparation was practically immaterial, the only decisive factor being the amount by weight of active compound per unit volume of soil, which is quoted in ppm (for example mg/l). The soil was filled into pots and the pots were left to stand at room temperature. After 24 hours the test animals were introduced into the treated soil and after a further 48 hours the degree of effectiveness of the active compound was determined in % by counting the dead and live test insects. The degree of effectiveness is 100% if all test insects were killed and is 0% if exactly as many test insects were still alive as in the case of the control.

The active compounds, amounts used and results can be seen from the Table 4 which follows:

Table 4

Soil insecticide test (*Tenebrio molitor* larvae in the soil)

| Active compound | Degree of destruction in % at an active compound concentration of | | |
|---|---|---|---|
| | 20 | 10 | 5 ppm |
| $(CH_3)_2CH-\underset{\underset{(3)}{}}{\overset{CN}{C}}=N-O-\overset{S}{\underset{}{P}}(OC_2H_5)_2$ | 100 | 100 | 75 |
| $C_2H_5-\underset{CH_3}{\overset{CH_3}{C}}-\underset{(1)}{\overset{CN}{C}}=N-O-\overset{S}{P}(OC_2H_5)_2$ | 100 | 100 | 90 |
| $CH_3-CH_2-CH_2-\underset{(4)}{\overset{CN}{C}}=N-O-\overset{S}{P}(OC_2H_5)_2$ | 100 | 100 | 100 |
| $\underset{C_2H_5O}{\overset{C_2H_5O}{>}}\overset{S}{P}-O-N=\overset{CN}{C}-C(CH_3)_3$ (E) (known) | 0 | | |
| $\underset{CH_3O}{\overset{CH_3O}{>}}\overset{S}{P}-O-N=\overset{CN}{C}-C(CH_3)_3$ (D) (known) | 100 | 50 | 0 |
| $\underset{CH_3O}{\overset{CH_3O}{>}}\overset{S}{P}-O-N=C(CH_3)_2$ (B) (known) | 0 | | |
| $\underset{C_2H_5O}{\overset{C_2H_5O}{>}}\overset{S}{P}-O-N=C(CH_3)_2$ (A) (known) | 0 | | |

EXAMPLE 5

Tetranychus test (resistant)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10 – 30 cm, were sprayed with the preparation of the active compound until dripping wet. These bean plants were heavily infested with the common or two-spotted spider mite (*Tetranychus urticae*) in all stages of development.

After the specified periods of time, the effectiveness of the preparation of active compound was determined by counting the dead mites. The degree of destruction thus obtained is expressed as a percentage: 100% means that all the spider mites were killed whereas 0% means that none of the spider mites were killed.

The active compounds, the concentrations of the active compounds, the evaluation times and the results can be seen from the following Table 5:

Table 5

(Tetranychus test)

| Active compound | Active compound concentration in % | Degree of destruction in % after 1 day |
|---|---|---|
| $(CH_3)_2C=N-O-\overset{S}{\overset{\|}{P}}(OCH_3)_2$ (known) (B) | 0.1 | 0 |
| $(CH_3)_3C-\underset{\|}{\overset{CN}{C}}=N-O-\overset{S}{\overset{\|}{P}}(OCH_3)_2$ (known) (D) | 0.1 | 0 |
| $(CH_3)_3C-\underset{\|}{\overset{CN}{C}}=N-O-\overset{S}{\overset{\|}{P}}(OC_2H_5)_2$ (known) (E) | 0.1 | 0 |
| $(CH_3)_3C-\underset{\|}{\overset{CN}{C}}=N-O-\overset{S}{\overset{\|}{P}}\overset{C_2H_5}{\underset{OC_2H_5}{\diagdown}}$ (known) (F) | 0.1 | 0 |
| $CH_3-CH_2-CH_2-\underset{\|}{\overset{CN}{C}}=N-O-\overset{S}{\overset{\|}{P}}(OC_2H_5)_2$ (4) | 0.1 | 90 |
| $(C_2H_5O)_2\overset{S}{\overset{\|}{P}}-O-N=\underset{\|}{\overset{CN}{C}}\underset{CH_3}{\diagup}\langle H \rangle$ (2) | 0.1 | 70 |

EXAMPLE 6

The oxime derivatives of the general formula (II) required as starting materials and not hitherto described in the literature were prepared, for example, as follows:

(a) 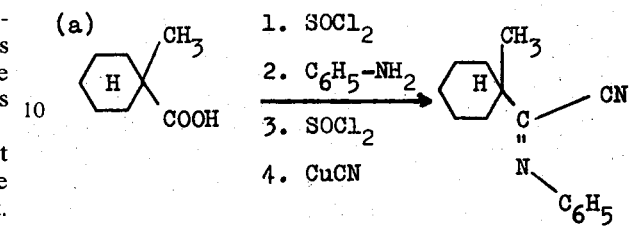

164 g (1.38 moles) of thionyl chloride were added dropwise to a solution of 177.5 g (1.25 moles) of 2,2-dimethylbutyric acid (Liebigs Anm. 618, 251 [1958]) and 1 ml of dimethylformamide in 350 ml of chlorobenzene at 80°C and the mixture was heated until the evolution of gas had ceased. 116 g (1.25 moles) of aniline were then added over the course of 1 hour and the suspension was heated for 3 hours under reflux. The mixture was cooled to 100°C, treated with 1 ml of dimethylformamide and reacted with 164 g 1.38 moles) of thionyl chloride in 1.5 hours. After the evolution of gas had ceased, 123 g (1.38 moles) of copper-(I) cyanide were added to the reaction mixture, which was heated to 100°C for 4 hours. 182 g (0.805 mole, 64% of theory) of α-phenylimino-β-methyl-hexahydrobenzylnitrile (boiling point 0.05 95°–99°C) were obtained from the filtered solution by distillation.

(b) 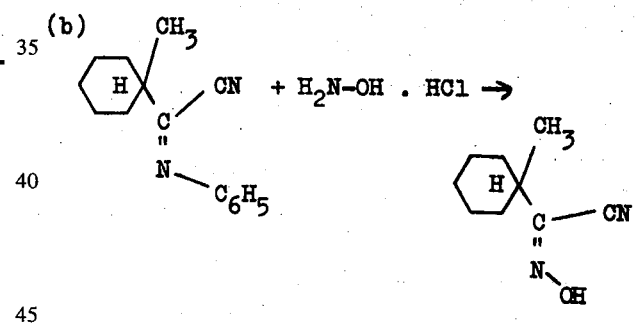

181 g (0.9 mole) of α-phenylimino-β-methylhexahydrobenzylnitrile and 56 g (0.8 mole) of hydroxyamine hydrochloride in 600 ml of ethanol were heated for 3 hours under reflux. The solution was concentrated under reduced pressure and taken up in methylene chloride and the methylene chloride solution was repeatedly extracted by shaking with hydrochloric acid and water. After drying the organic phase, 99 g (0.6 mole, 75% of theory) of 1-cyano-1-(1'-methylcyclohexyl)-ketonoxime were obtained by distillation at boiling point 0.02 94° – 96°C (melting point 62° – 64°C).

EXAMPLE 7

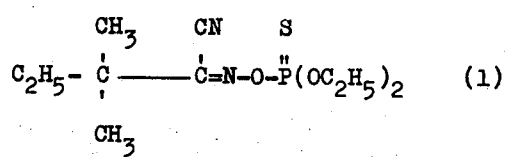

A mixture of 30 g (0.214 mole) of 1-cyano-1-(1',1'-dimethylpropyl)-ketonoxime, 200 ml of acetone and 32 g (0.23 mole) of potassium carbonate was warmed for half an hour at 50°C while stirring and thereafter 33.6 g (0.175 mole) of 0,0-diethylthionophosphoric acid ester-chloride were added at 50°C, with occasional external cooling. The batch was stirred overnight at room temperature and then poured into water. The oil which separated out was taken up in benzene and washed once with concentrated sodium hydroxide solution. After washing until it gave a neutral reaction, the benzene solution was dried and the solvent was distilled off, 52 g (100% of theory) of 0,0-diethyl-[1-cyano-1-(1',1'-dimethylpropyl)-ketonoxime]-thionophosphoric acid ester were obtained in the form of a light yellow oil of refractive index $n_D^{21}$: 1.4708.

The following compounds were prepared analogously

| Structure | Physical properties (refractive index) | Yield (% of theory) |
|---|---|---|
| 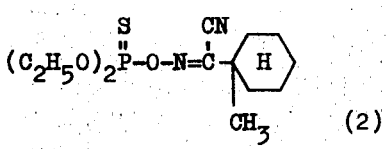 (2) | $n_D^{21}$: 1.4905 | 96 |
| 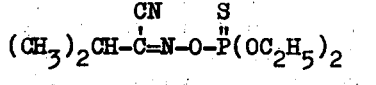 (3) | $n_D^{21}$: 1.4740 | 69 |
| 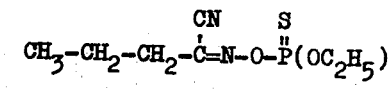 (4) | $n_D^{21}$: 1.4842 | 59 |

Other compounds which can be similarly prepared include:
 0-isopropyl-0-n-butyl-1-cyano-1-cyclopentylketonoxime-thionophosphoric acid esters, and
 0-methyl-0-ethyl-1-cyano-1-cyclohexylketonoxime-thionophosphoric acid ester,
and the like.

It will be appreciated that the instant specification and examples are set forth by way of illustration and not limitation, and that various modifications and changes may be made without departing from the spirit and scope of the present invention.

What is claimed is:

1. An 0,0-dialkyl-1-cyanoalkyl-ketonoxominethionophosphoric acid ester of the formula

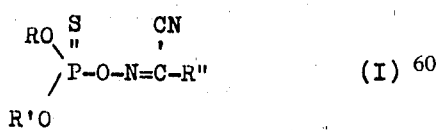

in which
 R and R' each independently is lower alkyl, and
 R'' is n-propyl, iso-propyl, 1,1-dimethyl-propyl or optionally methyl-substituted cyclopentyl or cyclohexyl.

2. A compound according to claim 1 in which R and R' each independently is alkyl of 1 to 3 carbon atoms.

3. The compound according to claim 1 wherein such compound is 0,0-diethyl-[1-cyano-1-(1',1'-dimethylpropyl)-ketonoxime]-thionophosphoric acid ester of the formula

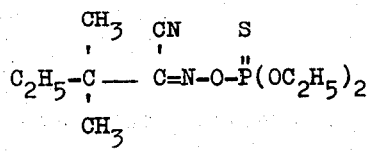

4. The compound according to claim 1 wherein such compound is 0,0-diethyl-[1-cyano-1-(1'-methylcyclohexyl)-ketonoxime]-thionophosphoric acid ester of the formula

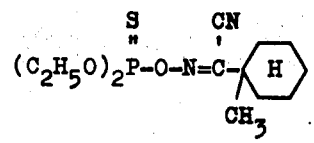

5. The compound according to claim 1 wherein such compound is 0,0-diethyl-[1-cyano-1-isopropyl-ketonoxime]-thionophosphoric acid ester of the formula

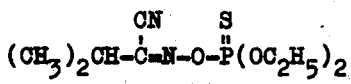

6. The compound according to claim 1 wherein such compound is 0,0-diethyl-[1-cyano-1-n-propylketonoxime]-thionophosphoric acid ester of the formula

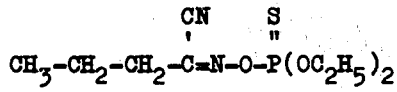

7. The compound according to claim 1 wherein such compound is 0,0-dimethyl-[1-cyano-1-(1'-methylcyclohexyl)-ketonoxime]-thionophosphoric acid ester of the formula

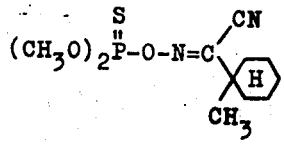

* * * * *